Figure 1:
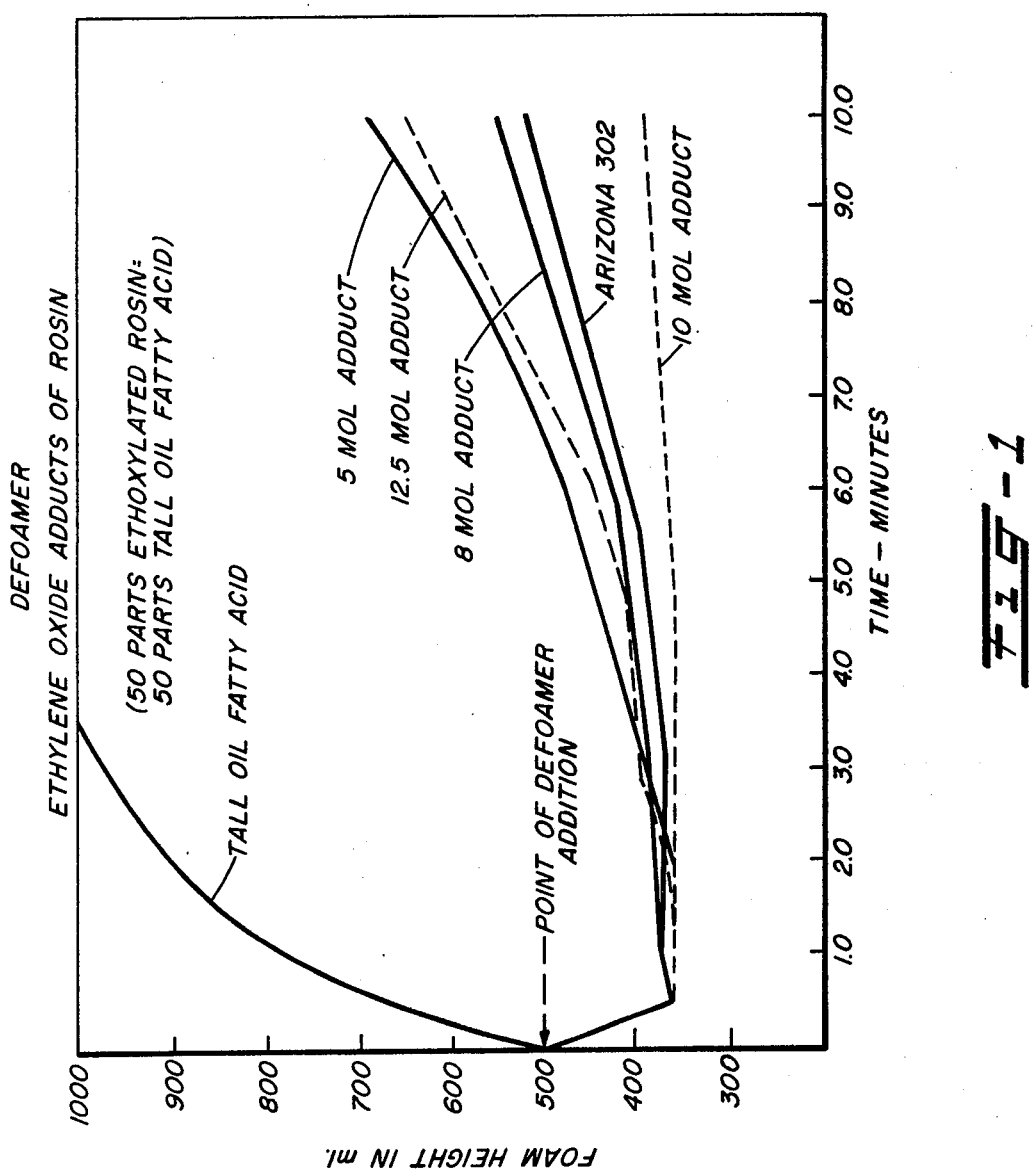

United States Patent
Sheers et al.

[15] 3,671,461
[45] June 20, 1972

[54] PROCESS FOR CONTROLLING FOAMS IN AQUEOUS SYSTEMS AND COMPOSITION THEREFOR

[72] Inventors: Edward Helmut Sheers, Flushing; Frederick Ludwig Encke, Bronx, both of N.Y.

[73] Assignee: Arizona Chemical Company, New York, N.Y.

[22] Filed: Dec. 18, 1969

[21] Appl. No.: 886,173

Related U.S. Application Data

[63] Continuation-in-part of Ser. No. 637,228, May 9, 1967, abandoned.

[52] U.S. Cl. ............................................. 252/358, 252/321
[51] Int. Cl. ........................................................ B01d 17/00

[58] Field of Search ........................................... 252/321, 358

[56] References Cited

UNITED STATES PATENTS

| | | | |
|---|---|---|---|
| 2,666,017 | 11/1954 | Moss et al. | 252/321 |
| 2,931,780 | 3/1960 | Steiner et al. | 252/321 |
| 3,000,835 | 9/1961 | Mayhew et al. | 252/321 |
| 3,236,769 | 2/1966 | Burdyn et al. | 252/8.5 |

Primary Examiner—John D. Welsh
Attorney—Charles J. Fickey

[57] ABSTRACT

Foam in aqueous media is controlled by compositions consisting essentially of (1) ethylene oxide adducts of rosin, and (2) fatty acids.

5 Claims, 4 Drawing Figures

PROCESS FOR CONTROLLING FOAMS IN AQUEOUS SYSTEMS AND COMPOSITION THEREFOR

This is a continuation-in-part of previous application Ser. No. 637,228, filed May 9, 1967 now abandoned.

This invention relates to a process for controlling and inhibiting foam in aqueous systems and to foam control agents.

Various aqueous systems are found in industry which are subject to undesirable foaming during manufacture and/or use. Such systems may be of the solution or dispersion type, the term "dispersion" being here employed generically to include emulsions of one liquid in another, suspensions of a solid in a liquid, and the like. By way of example, undesirable foaming may be encountered in the production and/or use of natural or synthetic rubber latices, rubber latex base paints, plastic latices, dyestuff preparations, pharmaceutical preparations such as penicillin which is made by aerobic fermentation, paper pulp in aqueous slurries, glue solution, drilling muds, materials used in textile finishing operations such as in the application of insoluble finishing compositions, e.g. water-proofing emulsions, and the like.

Such foaming is highly disadvantageous in that it frequently causes loss of the aqueous stock due to the overflowing of the foam; interferes with the proper operation of the apparatus containing the stock; brings about a flotation and aggregation of impurities of the stock; and results in irregularity of the materials treated with the stock or manufactures therefrom. On this account, a large number of substances have been tried out for the prevention of foam on the surface of aqueous stocks, with varying success. These substances are variously termed "foam killers," "defoamers," "anti-frothing agents," "anti-foaming agents" and the like. Not all agents which have been tried for this purpose are of general application, being ineffective or even harmful in the treatment of particular aqueous stocks. Furthermore, a large number of these agents are quite expensive and are not always available. Accordingly, there exists a considerable field for the introduction of novel anti-foaming agents.

It is therefore an object of this invention to provide a process for controlling foam in aqueous systems.

It is a further object to provide inexpensive, effective foam control agents.

A further object is to provide foam control agents which are compatible with a large number of aqueous systems.

These and other objects of the invention will become obvious as the description thereof proceeds.

We have found that the above objects may be attained by the use of the present invention which comprises the use of a composition consisting of (1) ethylene oxide addition products of tall oil rosin and (2) fatty acids to the aqueous system to inhibit, prevent or control foam.

Adducts of ethylene oxide and tall oil rosin may be produced as is well known in the art, according to the process disclosed in U.S. Pat. No. 1,970,578 to Schoeller et al. The products are nonionic surface active agents.

The number of mols of ethylene oxide per mol of tall oil rosin may be varied, but it has been found that a product particularly suited for the purposes of the invention is obtained when from about 5 to 20 and preferably 8 to 12 mols ethylene oxide are used for each mol of tall oil rosin.

The nonionic surfactants of the present invention were prepared by charging freshly chipped tall oil rosin to an autoclave, adding sodium hydroxide catalyst (1 percent on weight of rosin used), and adding ethylene oxide at 140° C.

The runs made are summarized below.

| Mols Ethylene Oxide per Mol Rosin | Number of Runs Made |
|---|---|
| 5 | 3 |
| 6 | 1 |
| 8 | 2 |
| 9 | 1 |
| 10 | 3 |
| 12.5 | 2 |
| 18 | 1 |

These materials are amber liquids when 5 to 10 mols ethylene oxide are added or waxy solids when 12.5 to 18 mols ethylene oxide are added. They exhibit a typical greenish fluorescence. Typically, a 10 mol adduct has a color (Gardner, 1963) of 14. Treatment with hydrogen peroxide results in a product with a color of 9.

The 5 and 8 mol adducts are slightly soluble in water; the 10, 12.5, and 18 mol adducts are readily water-soluble. They are very soluble in perchloroethylene, acetone, xylene, and alcohols. They are not soluble in kerosene or fuel oil.

The amount of adduct in the inventive foam control composition can vary from about 10 to 50 percent, preferably 20 to 40 percent of the total composition, with the balance being fatty acids.

Suitable fatty acids for use in the composition with the adducts are naturally occuring fatty acids such as tall oil fatty acids, tallow fatty acids, coconut oil fatty acids, and, in general, fatty materials containing fatty acids having from about 12 to 18 carbon atoms.

The amount of foam inhibitor used in the aqueous system may vary from one system to the other but will range from 0.001 to 1.0 percent.

In order to illustrate the effectiveness of the invention, the inventive foam control agents have been tested with various liquid systems. The following specific examples are set forth to illustrate the invention and are not intended to be limitative.

WET PROCESS PHOSPHORIC ACID

EXAMPLE 1

The purpose of the test in this example was to develop a foam control agent for wet-process phosphoric acid systems in which one or more of the ethoxylated rosins was used as the surface active agent.

Using an arbitrary blend of 59 parts tall oil fatty acid (Acintol FA-1, Arizona Chemical Company) and 50 parts surfactant, the 5, 8, 10, and 12.5 mol adducts were tested as foam control agents. The formulations are shown in Table I. These formulations were evaluated in wet-process phosphoric acid using an aeration test described in a paper presented to the Society of Mining Engineers, October 1966, "Evaluation of Foam Control Agents for Wet Phosphoric Acid Systems," J.J. Garbarino, F. L. Encke, and J. T. Geoghegan. Optimum results were obtained with a blend consisting of 50 parts 10 mol adduct and 50 parts tall oil fatty acid. This blend was found to be superior to Arizona 302 (a commercial fatty acid base defoamer from Arizona Chemical Co.). The results are shown in Table II and FIG. 1.

TABLE I

Foam Control Agent Formulations
For Wet-Process Phosphoric Acid

| Agents | Experimental Formulation | | | |
|---|---|---|---|---|
| | A | B | C | D |
| | Weight Percent | | | |
| Acintol FA-1 Tall Oil Fatty Acid | 50 | 50 | 50 | 50 |
| Rosin/EO-5 mols | 50 | — | — | — |
| Rosin/EO-8 mols | — | 50 | — | — |
| Rosin/EO-10 mols | — | — | 50 | — |
| Rosin/EO-12.5 mols | — | — | — | 50 |

TABLE II

Evaluation of Foam Control Agents
In Wet-Process Phosphoric Acid

| Time, Min. | Blank | Tall Oil Fatty Acids | Arizona 302 | Experimental Formulations | | | |
|---|---|---|---|---|---|---|---|
| | | | | A | B | C | D |

Foam Height in ml.

Table II – Continued

| | | | | | | | |
|---|---|---|---|---|---|---|---|
| 0.5 | 760 | 670 | 360 | 360 | 360 | 360 | 360 |
| 1.0 | >1000 | 780 | 360 | 360 | 370 | 360 | 370 |
| 1.5 | — | 870 | 360 | 370 | 380 | 360 | 370 |
| 2.0 | — | 910 | 370 | 370 | 380 | 360 | 370 |
| 1.5 | — | 930 | 370 | 380 | 380 | 360 | 380 |
| 3.0 | — | 980 | 370 | 390 | 380 | 360 | 380 |
| 4.0 | — | >1000 | 380 | 420 | 400 | 360 | 400 |
| 5.0 | — | — | 390 | 450 | 420 | 360 | 420 |
| 6.0 | — | — | 410 | 480 | 430 | 370 | 450 |
| 10.0 | — | — | 530 | 700 | 560 | 400 | 660 |

Test Conditions
 Temperature: 75°C
 Amount Foam Control Agent used: 0.02 ml.
 Test Liquor: Plant Grade phosphoric Acid Slurry from American Cyanamid Co., Brewster, Florida, Approx. 31% $P_2O_5$ content

EXAMPLE 2

In this example, a second series of formulations were prepared in which 80 parts of tall oil fatty acid and 20 parts of surfactant were used. The formulations are shown in Table III. In this series, the 5, 6, 8, 9, 10, 12.5, and 18 mol adducts were evaluated as foam control agents. The results are shown in Table IV. Optimum results were again obtained with the blend utilizing the 10 mol adduct as shown in Table IV. This formulation was found to be equal to or superior than Arizona 302, Hess D-501, Tenn. A-5, and Swift 67A, commercially available foam control agents from Arizona Chemical Co., Hess Oil Co., Tenneco Chemical Co., and Swift and Co., respectively.

TABLE III

Foam Control Agent Formulations
For Wet-process Phosphoric Acid

| Agents | Experimental Formulation | | | | | | |
|---|---|---|---|---|---|---|---|
| | A | B | C | D | E | F | G |
| | Weight Percent | | | | | | |
| Acintol FA-1 Tall Oil Fatty Acid | 80 | 80 | 80 | 80 | 80 | 80 | 80 |
| Rosin/EO–5 mols | 20 | — | — | — | — | — | — |
| Rosin/EO–6 mols | — | 20 | — | — | — | — | — |
| Rosin/EO–8 mols | — | — | 20 | — | — | — | — |
| Rosin/EO–9 mols | — | — | — | 20 | — | — | — |
| Rosin/EO–10 mols | — | — | — | — | 20 | — | — |
| Rosin/EO–12.5 mols | — | — | — | — | — | 20 | — |
| Rosin/EO–18 mols | — | — | — | — | — | — | 20 | control agents were prepared and evaluated for use in the pulp and paper process. Optimum results were obtained with the following formulations:

| Formulations | Percent |
|---|---|
| Stearic Acid | 5.0 |
| Humble-Esso 1501 Oil (a mineral oil) | 12.0 |
| Rosin/ethylene oxide (5 mols) | 20.0 |
| Hydropholic Silica | 2.0 |
| Polyvinyl Alcohol Resin (Gelvatol" 40–20, Shawinigan Resins Corp.) | 1.0 |
| Water | 60.0 |
| Total: | 100.0 |

Figure 2:
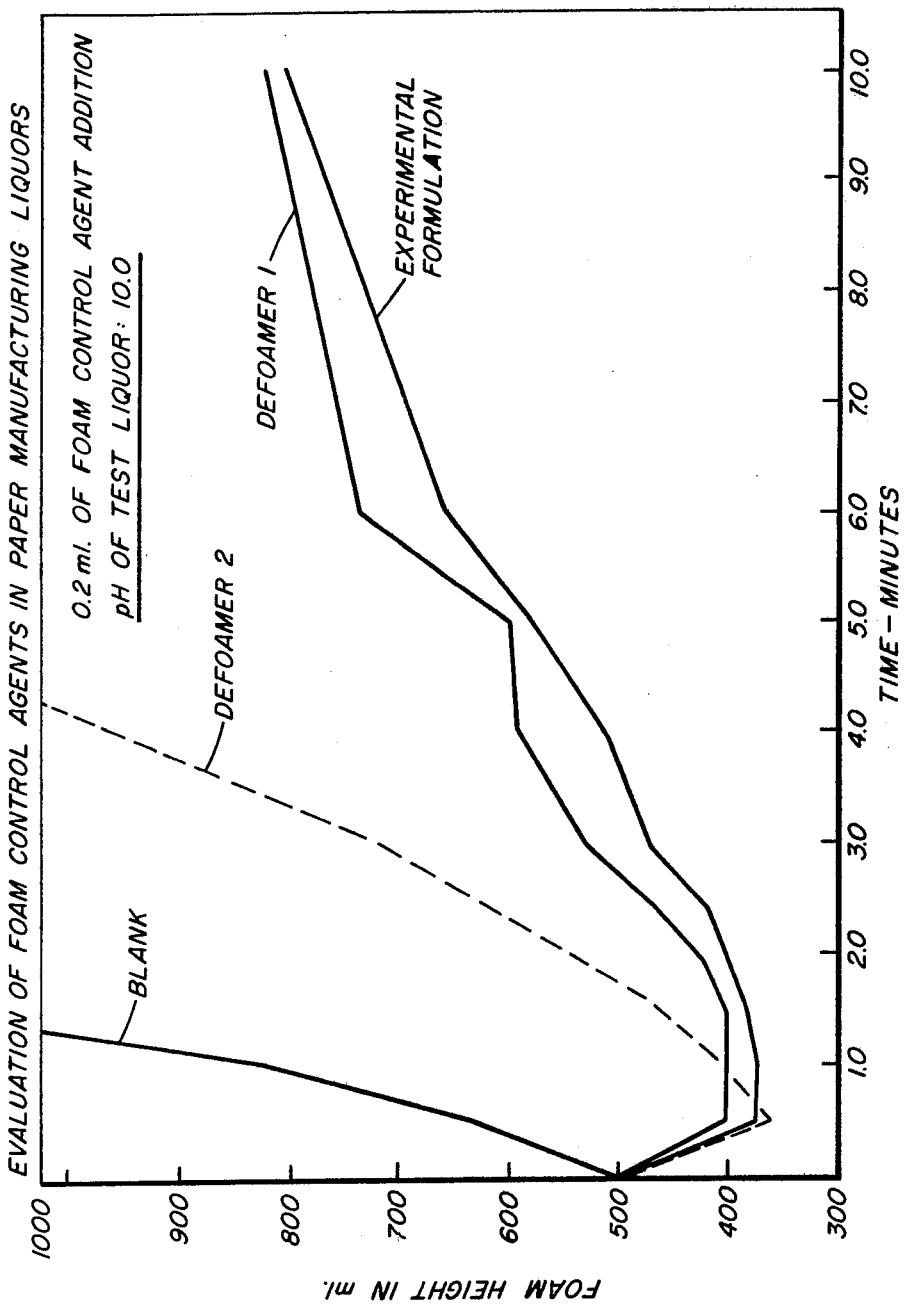
Figure 3:
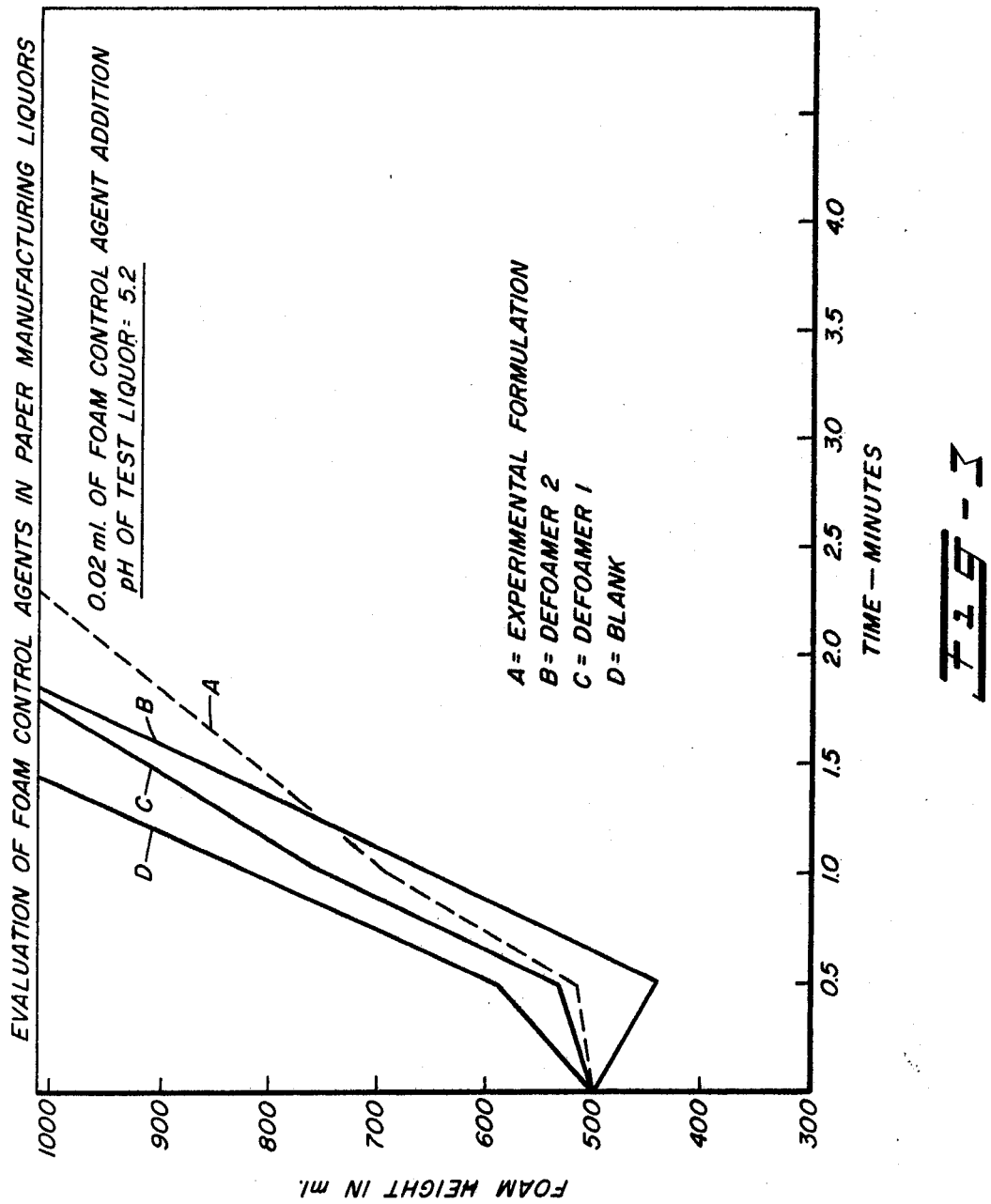

The above formulation was evaluated as a foam control agent against NOPCO KFS and NOPCO KFZ (commercially available foam control agents from Nopco Chemical Co.) in a foam medium of Marasperse N (a lignosulfonate type dispersant of Marathon Corporation), distilled water, and weak black liquor from the kraft process using the Aeration Test Method at room temperature. The pH of the foam medium had been adjusted to 5.2 and 10.0, respectively. This formulation was found to be equal to or superior to NOPCO KFS and NOPCO KFZ as shown in FIGS. 2 and 3. NOPCO KFS and NOPCO KFZ are designated as DEFOAMER 1 and DEFOAMER 2, respectively, on the figures.

MUNICIPAL AND INDUSTRIAL WASTES

EXAMPLE 4

The purpose of this example was to demonstrate the utility of one or more of these adducts in controlling foam in wastewater treatment plant effluents.
The following compositions are prepared:
A. 10 percent rosin/ethylene oxide (5 mols), 90 percent tall oil fatty acid heads,
B. 10 percent rosin/ethylene oxide (10 mols), 90 percent tall oil fatty acid heads,
C. 10 percent rosin/ethylene oxide (15 mols) 90 percent tall oil fatty acid heads,
D. 10 percent rosin/ethylene oxide (20 mols) 90 percent tall oil fatty acid heads.

A foaming substrate was prepared by adding 0.03 percent of sodium alkylbenzenesulfonate (Ultrawet 60–L) to a primary effluent obtained from the Stamford, Connecticut, Municipal Wastewater Treatment Plant. A laboratory faom control test was then conducted as follows:

TABLE IV.—EVALUATION OF FOAM CONTROL AGENTS IN WET-PROCESS PHOSPHORIC ACID

[Foam height in milliliters]

| Time, minutes | Blank | Tall oil fatty acid | Arizona-302 | Hess D-501 | Tenn. OA-5 | Swift 67-A | Experimental formulation | | | | | | |
|---|---|---|---|---|---|---|---|---|---|---|---|---|---|
| | | | | | | | A | B | C | D | E | F | G |
| 0.5 | 650 | 730 | 380 | 600 | 380 | 450 | 460 | 450 | 420 | 400 | 410 | 440 | 550 |
| 1.0 | 870 | 910 | 380 | 690 | 380 | 460 | 480 | 470 | 430 | 420 | 420 | 450 | 590 |
| 1.5 | >1,000 | >1,000 | 400 | 760 | 410 | 480 | 500 | 500 | 440 | 430 | 440 | 480 | 650 |
| 2.0 | | | 420 | 860 | 450 | 510 | 530 | 530 | 460 | 440 | 450 | 490 | 700 |
| 2.5 | | | 440 | 930 | 500 | 550 | 550 | 560 | 470 | 460 | 460 | 520 | 760 |
| 3.0 | | | 460 | >1,000 | 560 | 600 | 590 | 590 | 510 | 480 | 470 | 540 | 820 |
| 4.0 | | | 510 | | 630 | 690 | 670 | 680 | 570 | 520 | 530 | 600 | 920 |
| 5.0 | | | 580 | | 740 | 790 | 800 | 760 | 630 | 600 | 610 | 700 | >1,000 |
| 6.0 | | | 640 | | 890 | 880 | 950 | 830 | 710 | 690 | 670 | 800 | |
| 10.0 | | | 940 | | >1,000 | >1,000 | >1,000 | >1,000 | 970 | 950 | 940 | >1,000 | |

NOTE.—Test conditions: Temperature, 75° C.; Amount foam control agent used, 0.02 ml.; Test liquor, Plant grade phosphoric acid slurry from Cyanamid, Bradley, Florida, approximately 31% $P_2O_5$ content.

PAPER-MAKING

EXAMPLE 3

A series of homogeneous and water-dispersible paste foam

Figure 4:
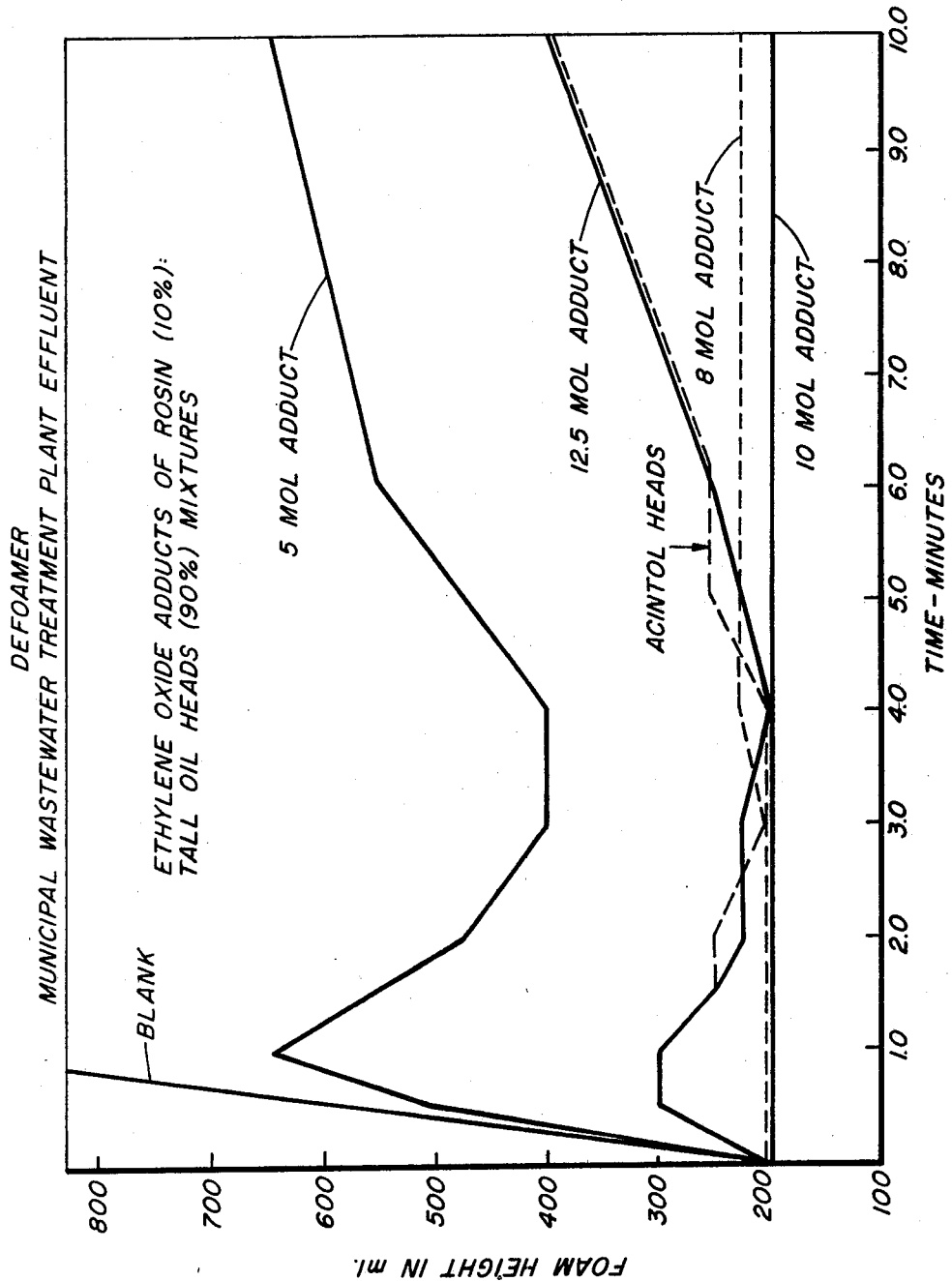

To 200 ml of the foaming solution in a one liter graduated cylinder, 0.1 ml of foam control agent was added by means of a pipet. The system was then aerated (sintered glass tube, C porosity, 0.5 liters air/minute) and foam height determined as function of time. Table V and FIG. 4 clearly show that optimum results were obtained with Solution C, a mixture consisting of 10 percent rosin/ethylene oxide (15 mols) and 90 percent tall oil fatty acid heads.

TABLE V

| | | Foam Height in ml. | | | | |
|---|---|---|---|---|---|---|
| Time (min.) | Blank | Soln. A | Soln. B | Soln. C | Soln. D | Tall Oil fatty acid Heads |
| 0.0 | 200 | 200 | 200 | 200 | 200 | 200 |
| 0.5 | 550 | 500 | 200 | 200 | 300 | 300 |
| 1.0 | 900 | 650 | 200 | 200 | 300 | 300 |
| 1.5 | 1200 | 500 | 200 | 200 | 250 | 250 |
| 2.0 | | 475 | 200 | 200 | 225 | 250 |
| 2.5 | | 425 | 200 | 200 | 225 | 200 |
| 3.0 | | 400 | 200 | 200 | 225 | 200 |
| 3.5 | | 400 | 225 | 200 | 200 | 200 |
| 4.0 | | 400 | 225 | 200 | 200 | 200 |
| 4.5 | | 425 | 225 | 200 | 225 | 250 |
| 5.0 | | 475 | 225 | 200 | 225 | 250 |
| 5.5 | | 500 | 225 | 200 | 225 | 250 |
| 6.0 | | 550 | 225 | 200 | 250 | 250 |
| 6.5 | | 600 | 225 | 200 | 250 | 250 |
| 7.0 | | 650 | 225 | 200 | 275 | 300 |
| 7.5 | | 675 | 225 | 200 | 275 | 350 |
| 8.0 | | 675 | 225 | 200 | 300 | 375 |
| 8.5 | | 650 | 225 | 200 | 350 | 375 |
| 9.0 | | 675 | 225 | 200 | 400 | 400 |
| 9.5 | | 650 | 225 | 200 | 400 | 400 |
| 10.0 | | 650 | 225 | 200 | 400 | 400 |

EXAMPLE 4

A short field trial was conducted at the Bay Park Municipal Wastewater Treatment Plant of the Nassau County Department of Public Works in East Rockaway, New York, as follows:

A solution of 10 percent rosin/ethylene oxide (10 mols) heads was sprayed, by means of an aerosol bomb, from a height of approximately 6 feet onto effluent having a layer of foam of approximately 6 to 8 inches on it. Immediate collapse of the foam was observed. The procedure was repeated at various other points in the treatment system with the same result.

It will be clear from the above description and examples that the inventive foam control compositions are effective for preventing foam in many industrial applications.

While we have disclosed certain specific embodiments and preferred modes of practice of our invention, this is solely for illustration, and it will be understood that various changes and modifications may be made in the invention without departing from the spirit of the disclosure or the scope of the appended claims.

We claim:

1. A composition for controlling foam in aqueous systems comprising from about 10 percent to about 50 percent based upon the weight of the composition of an adduct obtained by reacting from about 8 to about 12.5 moles of ethylene oxide with about one mole rosin, and from about 50 percent to about 90 percent based upon the weight of the composition of a fatty acid having from about 12 to about 18 carbon atoms.

2. A composition according to claim 1 wherein the fatty acid is selected from the group consisting of tall oil fatty acids, tallow fatty acids and coconut oil fatty acids.

3. A composition according to claim 1 wherein said rosin is tall oil rosin.

4. A method for controlling foam in aqueous systems which comprises adding to said system an effective amount of the composition of claim 1.

5. A method according to claim 4 wherein the amount of foam control composition added is from about 0.001 to 1 percent.

* * * * *